(12) United States Patent
Nadkarni

(10) Patent No.: US 8,032,300 B2
(45) Date of Patent: *Oct. 4, 2011

(54) METHOD AND SYSTEM FOR RESTRICTING THE USE OF POSITION DETERMINING DEVICES TO DEFINED REGIONS

(75) Inventor: Vivek Bhalchandra Nadkarni, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1303 days.

This patent is subject to a terminal disclaimer.

(21) Appl. No.: 11/362,972

(22) Filed: Feb. 27, 2006

(65) Prior Publication Data

US 2007/0005244 A1 Jan. 4, 2007

Related U.S. Application Data

(63) Continuation-in-part of application No. 10/392,995, filed on Mar. 19, 2003, now Pat. No. 7,050,907, and a continuation-in-part of application No. 10/952,607, filed on Sep. 28, 2004, now Pat. No. 7,313,476.

(51) Int. Cl.
*G01C 21/00* (2006.01)
(52) U.S. Cl. .................................... 701/213; 701/214
(58) Field of Classification Search .......... 701/207–214, 701/21, 300, 301; 340/989, 992, 993; 342/357.01, 342/357.06, 357.08, 457; 455/456.1–456.6
See application file for complete search history.

(56) References Cited

U.S. PATENT DOCUMENTS

| 6,166,688 A | 12/2000 | Cromer et al. |
| 6,965,816 B2 * | 11/2005 | Walker ............................ 701/16 |
| 7,050,907 B1 * | 5/2006 | Janky et al. .................... 701/213 |
| 7,313,476 B2 * | 12/2007 | Nichols et al. ................ 701/213 |
| 2003/0061166 A1 | 3/2003 | Saito et al. |
| 2005/0055574 A1 | 3/2005 | Chmaytelli |

* cited by examiner

*Primary Examiner* — Richard M. Camby

(57) ABSTRACT

In a position determining system that includes a position determining component such as a GPS receiver, and a controller, the system is made geographically dependent by providing a memory with geographic information to which position information from the position determining component is compared to determine whether the system is being used outside the permissible geographic region.

11 Claims, 2 Drawing Sheets

METHOD AND SYSTEM FOR RESTRICTING THE USE OF POSITION DETERMINING DEVICES TO DEFINED REGIONS

This is a continuation-in-part of application Ser. No. 10/392,995 filed Mar. 19, 2003 now U.S. Pat. No. 7,050,907 and application Ser. No. 10/952,607 filed Sep. 28, 2004. Applicants incorporate herein application Ser. Nos. 10/392, 995; 10/952607; 11/147,842; 11/146,757; 11/139,209, and 11/138,223 by reference which were filed previously and are commonly owned by the present applicant.

FIELD OF THE INVENTION

The invention relates to position determining devices such as GPS devices.

BACKGROUND OF THE INVENTION

The Global Positioning System (GPS) and the associated receivers are widely used in survey applications. A high precision high accuracy survey system consists of one or more GPS receivers commonly called "rovers" plus an associated set of reference stations that produce additional measurements for use by the rovers. The method of position determination in which the rovers are supplied with and use these measurements in real time, to determine their position relative to a specified reference location is commonly known as the Real-Time-Kinematic method (RTK.) Alternatively, another popular method for high accuracy position determination collects the measurement data from the reference stations and from the rovers and performs a post-measurement process to provide an accurate position relative to the reference location.

A common concern in marketing and sales is the question of price structures. In order to address the different economic strengths of different countries and communities it is desirable to provide for different sales prices. This, however, creates the risk of grey market goods being imported into higher cost regions from low cost regions. The present invention seeks to address this concern.

SUMMARY OF THE INVENTION

According to the invention there is provided a position determining system that includes a position determining component for receiving satellite based positional information, a memory for storing geographic information, a comparator for comparing information from the position determining component to geographic information from the memory, a data I/O, and a controller for controlling the functionality of the position determining component or controlling the data flow to the data I/O or controlling subsequent processing of the satellite based positional information, or including an offset distance into subsequent processing of the satellite based positional information, depending on the output of the comparator.

The system may further include a receiver for receiving correction data and correction means for improving the accuracy of the satellite based positional information using the correction data. The controller may then instead control the receiver or the correction means. Typically the position determining system is a GPS receiver, but may also comprise a GLONASS receiver or a Galileo receiver or any other satellite system signals such as any Satellite Based Augmentation Systems (SBAS) which includes at present WAAS, EGNOS and MSAS and is expected to include other Augmentation Systems from other countries in the future. These satellite systems together comprise a system of systems called the Global Navigation Satellite System (GNSS), and as used herein means any such receiver, or a receiver capable of receiving signals from any combination of such satellite systems in the GNSS. Since GPS is often synonymously used with GNSS and to simplify terminology, the term GPS will be used to cover all satellite system signals.

The purpose of the invention is to prevent unauthorized use of the GPS receiver in regions where such use is not allowed. Unauthorized use is prevented by denial of some or all data from the GPS receiver, or by implementation of a controllable degree of accuracy in the position data.

One or both of the comparator and controller may be implemented locally with the GPS receiver or, in another embodiment, in any separate entity receiving information from the GPS receiver such as a data collector. In this alternate embodiment, the system may include a wireless communications system for transmitting information to the data collector and the data flowing from the GPS receiver is preferably encrypted.

In addition, the controller may be operable to selectively determine the degree of accuracy of the final corrected positions, according rules associated with the location of the GPS receiver.

Further according to the invention there is provided a position determining system that includes a position determining component for receiving satellite based positional information, a memory for storing geographic information, a comparator for comparing information from the position determining component to geographic information from the memory, a wireless receiver for receiving correction information, e.g. for RTK or DGPS operation for improving the position accuracy, a data I/O, and a controller for controlling the functionality of the position determining component or of the wireless receiver or controlling the data flow to the data I/O or controlling subsequent processing of the satellite based positional information, or including an offset distance into subsequent processing of the satellite based positional information, depending on the output of the comparator. As discussed in earlier filed application Ser. Nos. 11/147,842; 11/146,757; 11/139,209, and 11/138,223 the offset distance can be introduced by any one of a number of techniques including adding an offset vector into processing of the satellite based positional information or synthesizing synthetic reference phases.

The controller may deactivate the wireless receiver or prevent the calculation of enhanced positional information from the correction information or prevent such enhanced positional information from being made available to the data I/O.

Still further according to the invention, there is provided a method of controlling the importation of grey market position determining system that include a position determining component, a controller and a memory, the method comprising storing geographic location parameters in the memory and comparing positional information from the position determining component to the geographic location parameters to determine whether the system is located within the confines of the geographic location parameters, and deactivating at least part of the system if the system is determined to be located outside the geographic location parameters.

DETAILED DESCRIPTION

Reference will now be made in detail to one embodiment of the present invention, as illustrated in the accompanying drawings. While the present invention will be described by reference to this embodiment, it will be understood that it is not intended to limit the invention to the particular embodiment. On the contrary, the invention is intended to cover alternatives, modifications, and equivalents that may be included within the scope of the invention as defined by the appended claims. Furthermore, in the following detailed description of the invention, numerous specific details are set forth in order to provide a thorough understanding of the invention. However, embodiments of the invention may be practiced without these specific details. In other instances, well-known methods, procedures, components, and circuits have not been described in detail so as not to unnecessarily obscure aspects of the invention.

Figure 1:
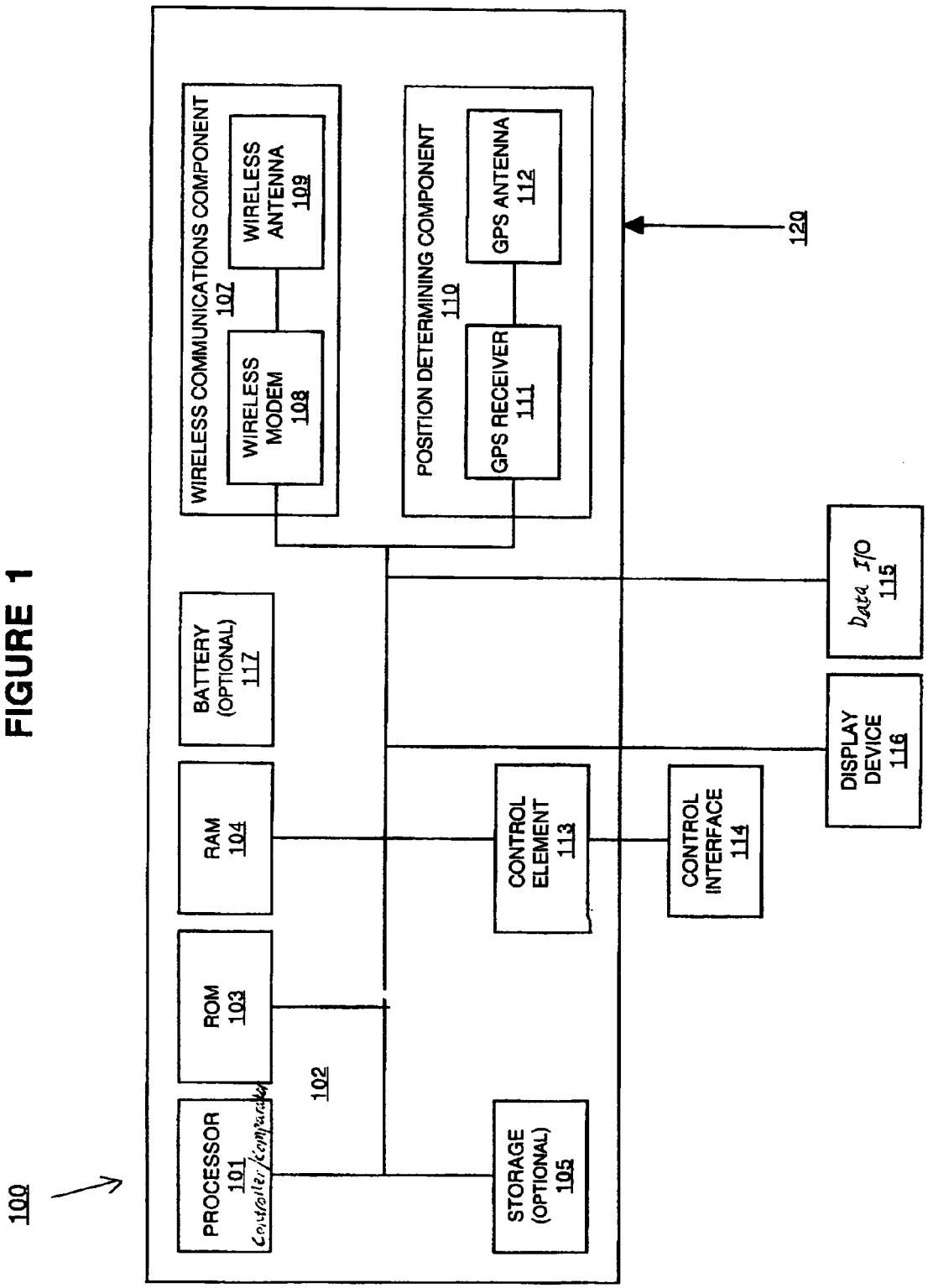
FIG. 1 is a block diagram of one embodiment of a position determining system in accordance with the invention.

FIG. 1 is a block diagram of one embodiment of a position determining system, 100 in accordance with the invention. The position determining system 100 includes a processor 101 coupled with an address/data bus 102. Processor 101 is for processing digital information and instructions and bus 102 is for conveying digital information between the various components of position determining system 100. Also coupled with bus 102 is non-volatile memory 103, e.g., read only memory (ROM) or EEPROM, for storing information and instructions of a more permanent nature along with volatile memory 104, e.g., random access memory (RAM), for storing the digital information and instructions of a more volatile nature. According to the invention, the memory 103 is provided with geographic location parameters. This will be discussed in further detail below. In addition, position determining system 100 may optionally include a data storage device 105. It will be appreciated that in another embodiment the geographic location parameters could be stored in data storage device 105.

In embodiments of the present invention, data storage device 105 may include a removable storage medium such as a smart card or an optical data storage device. Alternatively, data storage device 105 may include a programmable data storage device such as a flash memory device to facilitate quickly updating data. It is noted that instructions for processor 101 as well as position coordinates which define a pre-defined zone can be stored either in volatile memory 104, data storage device 105, and/or in an external storage device (not shown). Similarly, previously determined geographic locations of position determining system 100, and previously sampled GPS signals can be stored in volatile memory 104, data storage device 105, and/or in an external storage device. Configuration data for determining what action should be initiated depending upon one or more predefined circumstances (e.g., the current time and/or location) of position determining system 100 can also be stored in volatile memory 104, data storage device 105, and/or in an external storage device.

Within FIG. 1, wireless communications component 107, including a wireless modem 108 and a wireless antenna 109, are coupled with bus 102. This allows information to be sent to a remote location, e.g., information about the location of the system as determined by the position determining component 110 thereby allowing some of the processing to take place remotely. For instance, instead of processor 101 performing comparing functions in which positional data from the GPS receiver is compared to geographic information stored in memory 103, this may be performed remotely by sending the positional data obtained from the GPS receiver, to the remote location for comparative processing. Similarly controlling functionality in which the system controls one or more elements in the system to control the data or the quality of the data that is made available, could be performed remotely by sending the positional information to the remote location using the wireless communications component 107. Preferably any data send using the wireless communications component 107 is encrypted for security reasons.

The embodiment of FIG. 1 depicts a rover unit used in high precision surveying applications. The wireless receiver 107 therefore serves also to receive correction information from, for instance a base station, to allow the positional information from the position determining component 110 to be corrected for certain errors. In this embodiment, position determining component 110 comprises a GPS receiver 111 coupled to a GPS antenna 112 for gathering satellite based positional information. The GPS information is corrected using correction information received by the wireless receiver 107 to provide for differential GPS (DGPS) or for use with Real-Time Kinematic systems. In accordance with one embodiment of the invention, the processor 101 compares the positional information received from the position determining component 110 to the geographic location parameters stored in memory 103 and determines whether the system 100 is located outside its permissible region of operation as defined by the geographic location parameters. Thus, in one embodiment (discussed in more detail below) memory 103 is provided with a database of geographic coordinates defining a plurality of pre-defined zones and associated commands to be generated by processor 101 depending upon whether the GPS receiver is inside or outside a pre-defined zone. In this embodiment, not only was the user stopped from enjoying the full functionality of the system, one or both of the data interface, e.g. the user interface, and wireless communications component were provided with messages advising the user of the condition. It will be appreciated that in this embodiment, the data interface and wireless communications device would not be deactivated, but instead the location information would simply not be processed or be made available to the user. If the processor 101 determines that the system 100 is outside its permissible region of operation, different embodiments may initiate different actions. In one embodiment the user is prevented from viewing any positional information on the user interface. In another embodiment the rough positional information from the GPS may still be made available but the position fix derived from DGPS or RTK may be disabled or prevented from being sent to the user interface. This may be achieved in any number of ways by disabling certain components or parts of components. In particular, in one embodiment, the controller 101 is coded not to calculate the position corrections using the Differential GPS (DGPS) or Real Time Kinematic (RTK) information or not to transmit either the GPS or DGPS or RTK to the user interface. Instead certain driver transistors in the user interface may be pulled high or low by a deactivation signal from the controller 101.

In one embodiment, wireless communications component 107 comprises a point to point radio transceiver 108 and radio antenna 109. In another embodiment wireless communications component comprises a cellular wireless antenna 109 and a cellular wireless modem 108. In one embodiment, position determining system 100 sends and receives messages using the Short Message Service (SMS). However, the present invention is well suited to utilize other message formats as well. In other embodiments of the present invention, wireless communications component 107 may include a Bluetooth wireless communications device, or another wireless communications device such as a Wi-Fi transceiver. Wi-Fi transceivers are often used to create local area networks (LANs) between a portable computer and an Internet access point in public areas such as airports, coffee shops, restaurants, libraries, and the like.

Position determining component 110 can determine, at least roughly, the location of position determining system 100. In embodiments of the present invention, position determining component 110 includes a GPS antenna 112 and a GPS receiver 111. However, while the present embodiment specifically recites a GPS position determining system, other embodiments of the present invention are well suited to utilize a variety of other satellite-based position determining information or terrestrial-based information as well.

Within FIG. 1, a control element, also referred to herein as a controller or deactivation component 113 is coupled with bus 102 and can be used for generating a control signal via control interface 114 depending upon the current time and/or location of position determining system 100. It will be appreciated that the controller 113 could also be implemented to generate a deactivation control signal via control interface 114 to deactivate certain components such as the data interface (which in one embodiment comprises a user interface) and wireless communications component 107 in the event that the system 100 is determined to be outside its permissible geographic region. The control element 113 or deactivation component, in another embodiment, simply inhibits the transmission of positional information to the user interface. It will be appreciated that elements such as the deactivation component can be implemented in software and as suggested above may comprise code interpreted by the processor 101. Thus there need not be a physically separate controller 113 but simply a piece of code performing the stated control functionality.

In addition to deactivating one or more components of the system 100, one embodiment sends a message to the user, through the user interface, advising the user of the fact that the positional limitation requirements of the device have been violated. For ease of discussion, such messages will also be referred to herein as alarm messages.

The data I/O in this embodiment communicates with a user interface 204 which, in turn, includes a display device 116 for displaying information to a user. Display device 116 can be a liquid crystal device (LCD), cathode ray tube (CRT), a field emission display (FED), plasma display, or other display device suitable for creating graphic images and alpha-numeric characters recognizable to a user. Additionally, the user interface in this embodiment includes a user input device 115, which is also coupled to bus 102. In embodiments of the present invention, user input device 115 may include, but is not limited to, a keyboard, and a cursor control device (e.g., a mouse, trackball, light pen, touch pad, joystick, etc.), for inputting data, selections, updates, and controlling position determining system 100. While the data I/O is described herein as connecting to a user interface, other forms of data handling from the data I/O could be implemented in different embodiments including streaming to an external device, Logging to Internal Memory, Logging to External Memory.

The position determining system 100, in this embodiment, includes a battery 117 for providing power for position determining system 100. Note that the components of position determining system 100 may be disposed within a housing, as is discussed further detail below with respect to FIG. 2, which deals with one implementation of a mobile surveying station (rover) embodiment.

In survey systems of the present invention, position determining system 100 utilizes satellite-based position determining signals to determine its position. There are a variety of satellite-base position determining signal generating systems which can be utilized by embodiments of the present invention such as, but not limited to, the Global Positioning System (GPS), Differential GPS (DGPS), Eurofix DGPS, the Global Navigation Satellite System (GLONASS), the Galileo system, and the like. Furthermore, the present invention is well suited to utilize future implementations of satellite-based position determining systems.

As described above, embodiments of the present invention can determine the location of the GPS receiver and then compare the present location of the GPS receiver with a set of geographic coordinates of a pre-defined zone or route. In one embodiment the geographic information this is stored in non-volatile memory such as EEPROM 103. In particular, in one embodiment, the world is divided into little boxes or squares, each defining a latitude and longitude data point. The data points are associated with tags defining the data points as being within or outside a predefined region of operation. The region of operation may thus cover part of a country, entire countries or continents or even the entire world. The comparator takes positional information from the GPS receiver and looks up the closest latitude and longitude data point. It then determines whether such data point is defined as being within or outside the acceptable region for the particular system. Once the comparator has determined whether the system is being used outside its permissible region, control logic in the processor 101, or a separate control element 113 take action to limit access to the positional information, or in the case of an RTK or DGPS system, it may simply deny access or prevent calculation of the corrected positional information.

Figure 2:
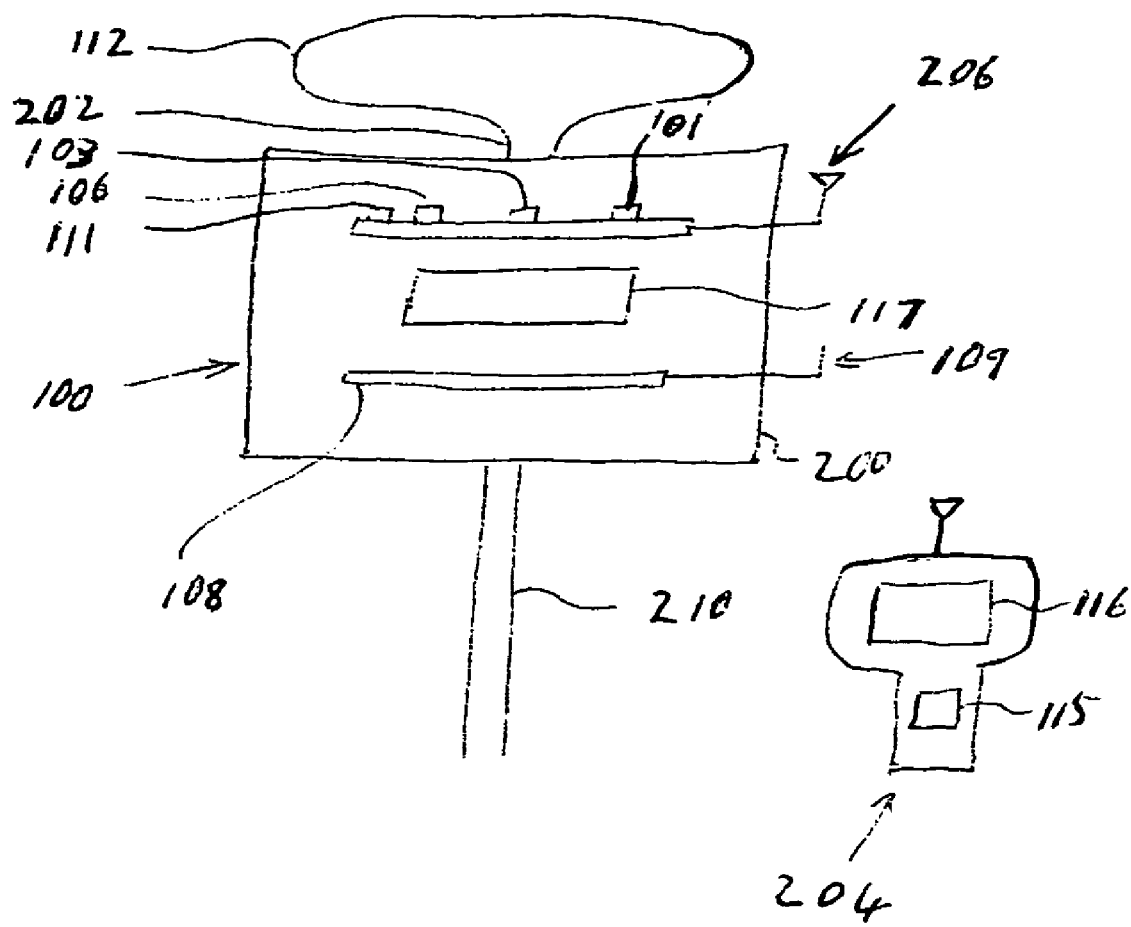
FIG. 2 is side view of one embodiment of a mobile surveying station in accordance with the invention.

One implementation of a position determining system 100 is shown in FIG. 2, which shows a side view of a mobile surveying station that makes use of GPS signals to provide positional information. The mobile surveying station 100 comprises a housing 200, which in this embodiment takes the form of an extruded aluminum cylinder with a lower and upper cover. The housing 200 houses a position determining component in the form of a GPS receiver 111 that is supported by a printed circuit board and is connected to a GPS antenna 112. As shown in FIG. 2, the GPS antenna 112 is secured to the upper cover of the housing 200, in this case, by means of a leg 202 that has an internally threaded hole complimentarily engaging a threaded stud (not shown) attached to the upper cover. The housing 200 also houses a wireless communications component 108 in the form of a printed circuit board that supports a radio transceiver with a radio antenna 109 for receiving position correcting information from a base station, and for transmitting corrected position information back to the base station or a central location such as a data gathering server. In this embodiment, the system 200 is powered by a battery 117. The system 200, further includes a user interface 204 that has a display 116 and a touch pad user input 115. The user interface 204 is in communications with the GPS receiver information through a Bluetooth connection. The Bluetooth antenna 206 is shown connected to the printed circuit board that supports the GPS receiver 111. The housing 200 in this embodiment is shown connected to a pole 210, as is common for surveying systems. In accordance with the invention, the housing 200 also houses a memory, which may be supported on the printed circuit board of the GPS receiver or of the wireless communications component. The memory 103, in this case is an EEPROM memory formed on the printed circuit board of the GPS receiver. The same board also supports a controller 101.

While specific types of data were considered above, it will be appreciated that different embodiments may make use of different types and classifications of data such as: position data, measurement data, position/measurement correction data, position/measurement quality data, navigation data.

Position data, in turn, includes types: Autonomous, Code Differential, Carrier Differential, Real Time Kinematic Carrier Differential, Inertially Aided. The position data could define Position, Velocity, Acceleration, Time.

Position quality data, in turn, includes: expected standard deviation of error of any of position data, expected standard deviation of horizontal error, pseudorange residuals of position data, phase residuals of position data, dilution of precision (GDOP, TDOP, PDOP, HDOP), circular error probable. Measurement data, in turn, includes: GNSS code observables, GNSS phase Observables. Navigation data, in turn, includes: ephemeris and almanac information from the satellites. As discussed above, GNSS includes one or more of: GPS, GLONASS, GALILEO, SBAS.

Correction data, in turn, includes: all types of measurement data, all types of position data, corrections in RTCM format, corrections in CMR format, and corrections from SBAS satellites.

The foregoing descriptions of specific embodiments of the invention have been presented for purposes of illustration and description. They are not intended to be exhaustive or to limit the invention to the precise forms disclosed, and obviously many modifications and variations are possible in light of the above teaching. While the invention has been described in particular embodiments, it is appreciated that the invention should not be construed as limited by such embodiments, but rather construed according to the following claims.

What is claimed is:

1. A position determining system comprising
   a position determining component for receiving satellite based positional information,
   a memory for storing geographic information,
   a comparator for comparing information from the position determining component to geographic information from the memory,
   a receiver for receiving correction data,
   correction means for improving the accuracy of the satellite based positional information using the correction data,
   a data I/O, and
   a controller for controlling the functionality of the position determining component or controlling the data flow to the data I/O or controlling subsequent processing of the satellite based positional information, or including an offset distance into subsequent processing of the satellite based positional information, depending on the output of the comparator, and wherein the controller controls the receiver or the correction means to prevent the calculation of enhanced positional information from the correction data or prevents such enhanced positional information from being made available to the data I/O.

2. A system of claim 1, wherein the position determining component includes a GPS receiver.

3. A system of claim 1, wherein the position determining component includes a Global Navigation Satellite System (GNSS) based receiver.

4. A system of claim 1, further comprising a wire-based or wireless user interface connected to the data I/O for receiving positional information over a communications line or wirelessly.

5. A position determining system, comprising
   a position determining component for receiving satellite based positional information,
   a memory for storing geographic information,
   a comparator for comparing information from the position determining component to geographic information from the memory,
   a data I/O,
   a communications component for communicating with a remote device and further configured for receiving correction data,
   correction means for improving the accuracy of the satellite based positional information using the correction data to provide enhanced positional information, and
   a controller for controlling the functionality of the position determining component or of the wireless receiver or controlling the data flow to the data I/O or controlling subsequent processing of the satellite based positional information, or including an offset distance into subsequent processing of the satellite based positional information, depending on the output of the comparator, and wherein controlling the functionality further includes preventing improving the positional information using the correction data or preventing the improved positional information from being made available to the user interface or to the wireless communications component.

6. A system of claim 5, wherein the communications component is configured to transmit positional information to a remote device.

7. A system of claim 5, wherein the communications component is configured to transmit enhanced positional information.

8. A system of claim 6, further comprising a wire-based or wireless user interface connected to the data I/O for receiving positional information over a communications line or wirelessly.

9. A system of claim 5, wherein the position determining component includes a GPS receiver.

10. A system of claim 5, wherein the position determining component includes a Global Navigation Satellite System (GNSS) based receiver.

11. A method of controlling the importation of grey market position determining systems that include a position determining component, a controller, a user interface, and a memory, the method comprising
    storing geographic location parameters in the memory,
    comparing positional information from the position determining component to the geographic location parameters to determine whether the system is located within the confines of the geographic location parameters,
    sending an alarm signal to the user interface if the system is determined to be located outside the geographic location parameters, and
    deactivating or modifying at least part of the system if the system is determined to be located outside the geographic location parameters.

* * * * *